Patented Apr. 30, 1935

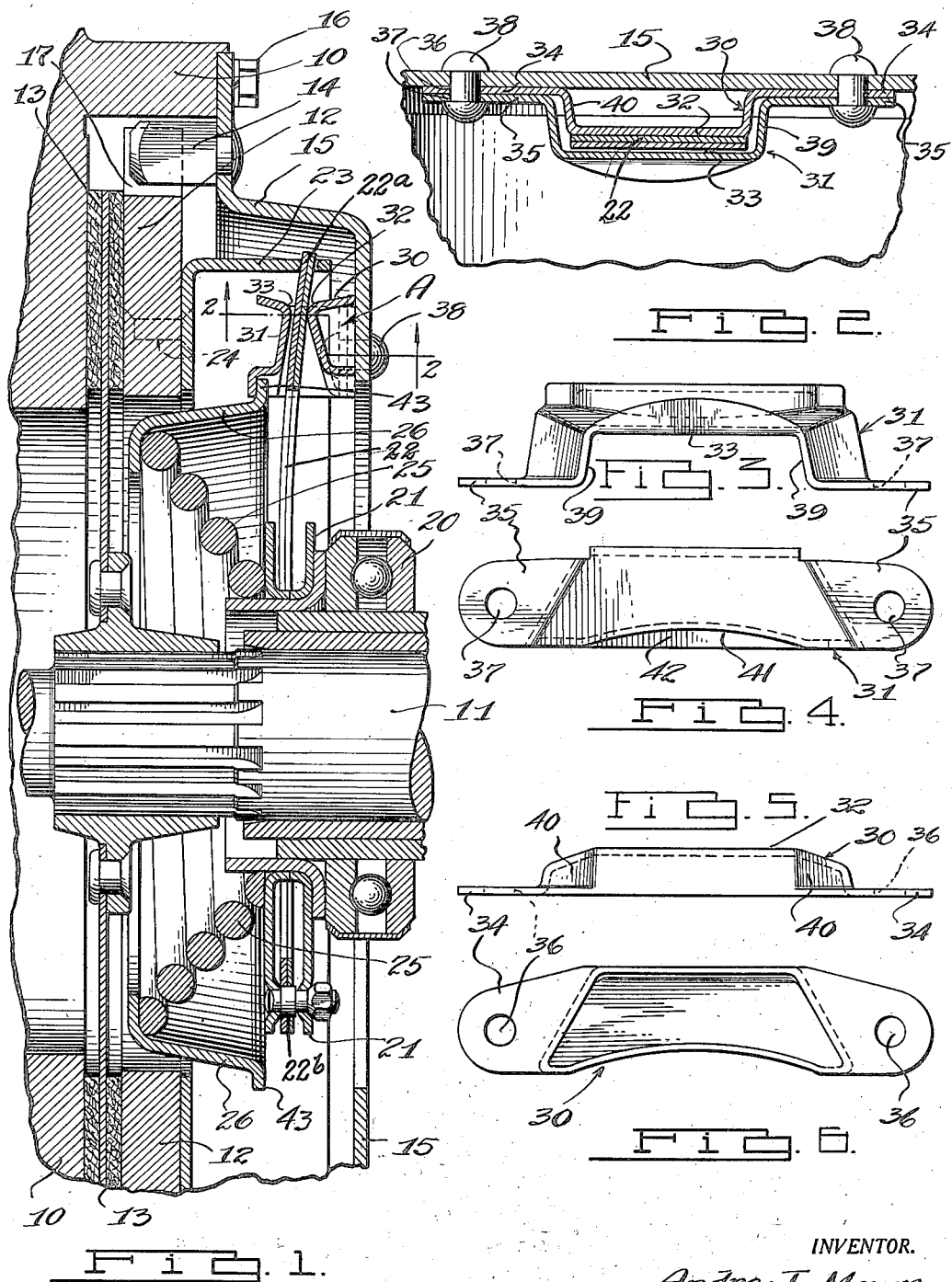

1,999,510

UNITED STATES PATENT OFFICE 1,999,510

CLUTCH

Andre J. Meyer, Detroit, Mich., assignor to Continental Motors Corporation, Detroit, Mich., a corporation of Virginia Application January 19, 1931, Serial No. 509,635

22 Claims. (Cl. 192—68)

My invention relates to clutches and more particularly to the means for fulcruming the pressure transmitting clutch lever.

In clutches of the general character as shown in the illustrated embodiment of my invention it has been the aim of engineers and others engaged in the manufacture of such devices to provide a clutch structure which may be more economically manufactured but which will render efficient service with a minimum of maintenance costs.

It is the object of my invention to thus construct an efficiently operated clutch which may be economically manufactured by providing a simple device for fulcruming the pressure transmitting lever means which may be economically manufactured and readily assembled with the clutch with a minimum of time and labor.

A further object of my invention is to provide an improved clutch lever fulcruming means by constructing the same of sheet metal thereby providing a novel structure of minimum cost which provides for economical manufacture with quantity production.

For a more detailed understanding of my invention, reference may be had to the accompanying drawing which illustrates one form which my invention may assume, and in which:

Figure 1 is a longitudinal sectional view through a clutch constructed in accordance with my invention and illustrating a sheet metal lever fulcruming device of novel construction, Figure 2 is a detail sectional view taken substantially on the line 2—2 of Figure 1, Figure 3 is an edge elevational view of one of the fulcruming members, Figure 4 is a bottom plan view thereof, Figure 5 is an edge elevational view of another fulcruming member adapted for cooperative association with the member illustrated in Figures 3 and 4, and Figure 6 is a bottom plan view of the fulcruming member illustrated in Figure 5.

My novel lever fulcruming means is adapted for association with a clutch comprising driving and driven means 10 and 11, sometimes referred to as the flywheel and driven shaft respectively. Driving and driven members 12 and 13 more particularly designated as the pressure plate and clutch disc respectively, are connected in driving connection with the driving means or flywheel 10 and the driven means or shaft 11. The driving member is preferably connected with the flywheel by means of the driving lugs 14 carried by the back plate 15, which in turn is adapted to be secured to the flywheel 10 by means of bolts or other fastening devices 16. These driving lugs engage in slots 17 carried by the driving member or pressure plate 12 to provide this driving engagement between the driving means and driving member.

Slidably mounted on the driven shaft 11 is the usual type of clutch collar 20 which carries lever engaging collars or rings 21 adapted for engagement with the inner end of pressure transmitting clutch levers 22. These levers are fulcrumed on the fulcruming device A, and the outer ends of said lever means designated as actuating points 22a are preferably engaged with a thrust member 23 which may be rigidly attached to the driving member or pressure plate 12 by means of rivets or other fastening devices 24. A spring or other suitable yielding means 25 engages the lever collars 21 and exerts a force on the inner end of the levers designated as loading points 22b for urging the pressure plate 12 into clutch engagement with the clutch disc 13. The other end of this spring bears against an abutment member 26 which may be anchored by any suitable means, but I find it desirable to anchor the spring abutment member to the fulcruming means A.

My novel fulcruming means comprises a pair of cooperating sheet metal lever fulcruming members 30 and 31, these members being provided with lever engaging portions 32 and 33 respectively. The lever fulcruming members are constructed substantially U-shaped and are provided with laterally extending flanges 34 and 35 respectively, the flange 35 of the member 31 overlying the flange 34 of the member 30, each of these flanges being provided with perforations 36 and 37 respectively which are adapted to register when the cooperating lever fulcruming members are assembled together. Suitable fastening devices, such as rivets 38 may be passed through these registering perforations in the flanges of the lever fulcruming members for securing the said members to the back plate of the clutch. It will be noted that the side legs 39 of the member 31 are longer than the side legs 40 of the member 30 and the member 31 is super-imposed on the member 30 whereby the lever engaging portions 32 and 33 are spaced with respect to each other, thereby providing a lever fulcruming structure having an opening through which the lever means may be projected. It may be noted that the lever fulcruming members are adapted for engagement with opposite sides of the lever means.

Preferably, these lever fulcruming members are stamped out of sheet metal and so formed with flanges and side walls that they provide a rigid structure which is not easily distorted when subjected to the load which they are to carry in transmitting forces for effecting a clutch engagement or disengagement of the driving and driven members of the clutch.

The lever fulcruming member 31 is preferably provided with a recessed portion 41 which provides a lip or flange 42 that is adapted to be engaged by the outwardly extending annular flange 43 carried by the spring abutment member 26. Since this lever fulcruming member is rigidly attached or carried by the back plate the spring abutment member is thereby supported rigidly with respect to the back plate.

It will be noted that I have provided a novel lever fulcruming device which can be very economically manufactured in quantity production with a minimum of cost and labor. Furthermore, my fulcruming device comprises cooperating metal stampings which may be quite readily assembled together and secured to the back plate of the clutch.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In a clutch having driving and driven members, lever means for relatively moving the members into or out of clutch engagement, a back plate, and lever fulcruming means carried by said back plate and comprising cooperating sheet metal fulcruming members alternately engaging said lever on moving said members into and out of clutch engagement.

2. In a clutch having driving and driven members, lever means for relatively moving the members into or out of clutch engagement, a back plate, and lever fulcruming means carried by said back plate and comprising spaced cooperating fulcruming members alternately engaging said lever on moving said members into and out of clutch engagement.

3. In a clutch having driving and driven members, lever means for relatively moving the members into or out of clutch engagement, a back plate, lever fulcruming means comprising spaced cooperating fulcruming members engaging said lever, and fastening devices for securing said members to said back plate.

4. In a clutch having driving and driven members, lever means for relatively moving the members into or out of clutch engagement, a back plate, lever fulcruming means secured to said back plate and comprising a pair of substantially U-shaped fulcruming members rested together, said fulcruming members having spaced lever engaging portions.

5. In a clutch having driving and driven members, lever means for relatively moving the members into or out of clutch engagement, a back plate, lever fulcruming means secured to said back plate and comprising a pair of substantially U-shaped fulcruming members nested together, said fulcruming members having lever engaging portions, one of said fulcruming members having longer legs than the other to space said lever engaging portions on assembly of said members with said back plate, whereby to provide a lever fulcruming structure having an opening through which said lever means may be projected.

6. In a clutch having driving and driven members, lever means for moving the same into or out of clutch engagement, said lever means having loading and actuating points respectively disposed at opposite ends of said lever means, and lever fulcruming means comprising a pair of cooperating fulcruming members having spaced lever engaging fulcruming portions engaging said lever means at an intermediate point between the loading point and the actuating point, whereby to provide a lever fulcruming structure having an opening through which said lever means may be projected.

7. In a clutch having driving and driven members, lever means for relatively moving the same into or out of clutch engagement, said lever means having loading and actuating points respectively disposed at opposite ends of said lever means, and lever fulcruming means comprising a pair of cooperating fulcruming members having lever engaging fulcruming portions arranged in spaced parallel relation with each other and constructed to alternately engage said lever means at an intermediate point between the loading point and the actuating point and on opposite sides of said lever means as said members are moved into and out of clutch engagement.

8. In a clutch having driving and driven members, lever means for relatively moving the members into or out of clutch engagement, a back plate, lever fulcruming means comprising a pair of cooperating fulcruming members having lever engaging portions and overlapping flanges having registering openings, and fastening devices engaging said registering openings of said overlapping flanges to secure said members to said back plate.

9. In a clutch having driving and driven members, means including a spring and lever means for relatively moving said members to effect a clutch engagement or disengagement of said driving and driven members, a back plate, lever fulcruming means consisting of cooperating lever fulcruming members, and a spring abutment supported by one of said members.

10. In a clutch having driving and driven members, means including a spring and lever means for relatively moving said members to effect a clutch engagement or disengagement of said driving and driven members, a back plate, lever fulcruming means carried by said back plate and comprising cooperating sheet metal lever fulcruming members, one of said fulcruming members having a recessed portion, and a spring abutment having a portion arranged for engagement in the recess carried by said fulcruming member to anchor said spring abutment.

11. In a clutch having driving and driven members, lever means for relatively moving the members into or out of clutch engagement, a back plate, and lever fulcruming means carried by said back plate and comprising cooperating lever fulcruming members, one of said lever fulcruming members superimposed over the other, said lever fulcruming members adapted for alternate engagement with said lever means as said driving and driven members are moved into and out of clutch engagement.

12. In a clutch having driving and driven members, lever means for relatively moving the members into or out of clutch engagement, a back plate, and lever fulcruming means carried by said back plate and comprising cooperating lever fulcruming members, one of said members superimposed over the other in spaced relation therewith whereby to provide a lever fulcruming structure having an opening through which said lever means may be projected.

13. In a clutch having driving and driven members, lever means for relatively moving the members into or out of clutch engagement, a back plate, and lever fulcruming means carried by said back plate and comprising sheet metal lever fulcruming members, one of said members superimposed over the other.

14. In a clutch having driving and driven members, lever means for relatively moving the members into or out of clutch engagement, a back plate, and lever fulcruming means carried by said back plate and comprising sheet metal lever fulcruming members, one of said members superimposed over the other in spaced relation therewith.

15. In a clutch having driving and driven members, lever means for relatively moving the members into or out of clutch engagement, a back plate, and lever fulcruming means carried by said back plate and comprising sheet metal lever fulcruming members, one of said members superimposed over the other and providing spaced substantially parallel lever engaging fulcruming portions.

16. In a clutch having driving and driven members, lever means for relatively moving the members into or out of clutch engagement, a back plate, and lever fulcruming means carried by said back plate and comprising spaced cooperating lever fulcruming members having radially inwardly diverging wall portions providing clearance for said lever means.

17. In a clutch having driving and driven members, lever means for relatively moving the members into or out of clutch engagement, a back plate, and lever fulcruming means carried by said back plate and comprising spaced cooperating lever fulcruming members having radially outwardly converging wall portions substantially terminating in lever engaging fulcruming portions.

18. In a clutch having driving and driven members, lever means for relatively moving the members into or out of clutch engagement, a back plate, and lever fulcruming means carried by said back plate and comprising spaced cooperating lever fulcruming members having substantially parallel lever engaging fulcruming portions adjacent that portion of said fulcruming means remote from the inner end of said lever means.

19. In a clutch having driving and driven members, lever means for relatively moving the members into or out of clutch engagement, a back plate, and lever fulcruming means carried by said back plate and comprising spaced cooperating lever fulcruming members having substantially parallel lever engaging fulcruming portions adjacent that portion of said fulcruming means remote from the inner end of said lever means, said members having portions extending radially inwardly of the clutch providing spaced diverging wall portions.

20. In a clutch having driving and driven members, lever means for relatively moving the members into or out of clutch engagement, a back plate, and lever fulcruming means carried by said back plate and comprising sheet metal lever fulcruming members, one of said members superimposed over the other, and common fastening devices for securing said members to the back plate.

21. In a clutch having driving and driven members, lever means for relatively moving the members into or out of clutch engagement, a back plate, and lever fulcruming means carried by said back plate and comprising sheet metal fulcruming members having opposed U-shaped cross-sections in a plane axially of the clutch, said members providing spaced lever engaging fulcruming portions.

22. In a clutch having driving and driven members, lever means for relatively moving the members into or out of clutch engagement, said lever means including a relatively wide flat portion, a back plate, and lever fulcruming means carried by said back plate and comprising a pair of cooperating lever fulcruming members, said members each having a lever engaging fulcruming portion arranged in spaced relation with each other to provide an elongated opening through which said relatively wide flat portion of said lever means may be projected.

ANDRE J. MEYER.